United States Patent
Nguyen et al.

(10) Patent No.: US 12,527,548 B2
(45) Date of Patent: Jan. 20, 2026

(54) ULTRASOUND SYSTEM AND METHODS FOR SMART SHEAR WAVE ELASTOGRAPHY

(71) Applicant: KONINKLIJKE PHILIPS N.V., Eindhoven (NL)

(72) Inventors: Man Nguyen, Melrose, MA (US); Claudia Errico, Cambridge, MA (US); Marcin Arkadiusz Balicki, Cambridge, MA (US); Grzegorz Andrzej Toporek, Boston, MA (US); Hua Xie, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1024 days.

(21) Appl. No.: 17/270,578

(22) PCT Filed: Aug. 21, 2019

(86) PCT No.: PCT/EP2019/072328
§ 371 (c)(1),
(2) Date: Feb. 23, 2021

(87) PCT Pub. No.: WO2020/043561
PCT Pub. Date: Mar. 5, 2020

(65) Prior Publication Data
US 2021/0338204 A1  Nov. 4, 2021

Related U.S. Application Data

(60) Provisional application No. 62/724,076, filed on Aug. 29, 2018.

(51) Int. Cl.
*A61B 8/00* (2006.01)
*A61B 8/08* (2006.01)
*G06N 3/02* (2006.01)

(52) U.S. Cl.
CPC ............... *A61B 8/485* (2013.01); *A61B 8/08* (2013.01); *A61B 8/461* (2013.01); *A61B 8/483* (2013.01); *A61B 8/5207* (2013.01); *G06N 3/02* (2013.01)

(58) Field of Classification Search
CPC ................... A61B 8/485; G06N 3/02
See application file for complete search history.

(56) References Cited

U.S. PATENT DOCUMENTS

| | | |
|---|---|---|
| 6,443,896 B1 | 9/2002 | Detmer |
| 6,530,885 B1 | 3/2003 | Entrekin et al. |

(Continued)

FOREIGN PATENT DOCUMENTS

| | | | |
|---|---|---|---|
| CN | 105816204 A | * | 8/2016 |
| WO | 2019155037 A1 | | 8/2019 |

OTHER PUBLICATIONS

Nabavizadeh et al., "Optimized Shear Wave Generation Using Hybrid Beamforming Methods," (Jan. 2014), Ultrasound in Medicine & Biology, vol. 40, Issue 1, Jan. 2014, pp. 188-199. (Year: 2014).*

(Continued)

*Primary Examiner* — Keith M Raymond
*Assistant Examiner* — Ashish S Jasani

(57) ABSTRACT

The present disclosure includes ultrasound systems and methods for smart shear wave elastography in anisotropic tissue. An example method may include identifying muscle fiber structures from a 3D ultrasound image dataset. The method may include providing a representation of at least one identified muscle fiber structure relative to a surface of a transducer. The method may include selecting at least one of the identified muscle fiber structures. The method may include determining a target measurement plane based on an orientation of the selected muscle fiber structure. The method may also include transmitting ultrasound pulses in (Continued)

accordance with a sequence configured to perform shear wave imaging in the target measurement plane.

20 Claims, 9 Drawing Sheets

(56) References Cited

U.S. PATENT DOCUMENTS

| | | | |
|---|---|---|---|
| 2015/0005633 A1* | 1/2015 | Kanayama | A61B 8/5207 600/438 |
| 2015/0320394 A1 | 11/2015 | Arnal et al. | |
| 2016/0143621 A1* | 5/2016 | Parthasarathy | G01S 7/52042 600/438 |
| 2016/0345938 A1* | 12/2016 | Tanter | G16H 50/30 |
| 2017/0181729 A1* | 6/2017 | Tanter | G01S 7/52042 |
| 2018/0000455 A1* | 1/2018 | Bercoff | G01S 7/52022 |
| 2019/0328364 A1* | 10/2019 | Questa | A61B 8/485 |
| 2020/0383658 A1* | 12/2020 | Wang | A61B 8/467 |
| 2021/0022715 A1* | 1/2021 | Brattain | G16H 50/50 |

OTHER PUBLICATIONS

Cunningham et al., "Estimating Full Regional Skeletal Muscle Fibre Orientation from B-Mode Ultrasound Images Using Convolutional, Residual, and Deconvolutional Neural Networks," (Jan. 22, 2018), Medical Image Understanding and Analysis, 2017; pp. 63-73. (Year: 2018).*

Bercoff et al., "Supersonic shear imaging: A new technique for soft tissue elasticity mapping," (Apr. 2004) IEEE Transactions on Ultrasonics, Ferroelectrics, and Frequency Control, vol. 51, No. 4. (Year: 2004).*

Of Chen et al., "Improved Plane-Wave Ultrasound Beamforming by Incorporating Angular Weighting and Coherent Compounding in Fourier Domain," (Mar. 5, 2018), IEEE Transactions on Ultrasonics, Ferroelectrics, and Frequency Control, vol. 65, Issue: 5, May 2018. (Year: 2018).*

Gennisson et al., "Viscoelastic and Anisotropic Mechanical Properties of in vivo Muscle Tissue Assessed by Supersonic Shear Imaging," (May 2010), Ultrasound in Medicine & Biology, vol. 36, Issue 5, May 2010, pp. 789-801. (Year: 2010).*

Lee et al., "Mapping Myocardial Fiber Orientation Using Echocardiography-Based Shear Wave Imaging", Mar. 19, 2011, IEEE Transactions on Medical Imaging, vol. 31, Issue: 3, Mar. 2012 (Year: 2011).*

Eby et al., "Validation of shear wave elastography in skeletal muscle," (Sep. 27, 2013), Journal of Biomechanics, vol. 46, Issue 14, Sep. 27, 2013, pp. 2381-2387. (Year: 2013).*

Aristizabal et al: "Shear Wave Vibrometry Evaluation in Transverse Isotropic Tissue Mimicking Phantoms and Skeletal Muscle"; Phys Med Biol. Dec. 21, 2014,: 59(24): pp. 7735-7752.

Badrinarayanan et al: "Segnet:A Deep Convolutional Encoder-Decoder Architecture for Image Segmentation"; IEEE Transactions on Pattern Analysis and Machine Intelligence, vol. 39, No. 12, Dec. 2017, pp. 2481-2495.

Chatelin: "Modelling the Impulse Diffraction Field of Shear Waves in Transverse Isotropic Viscoelastic Medium"; Phys. Med. Biol. 60,(2015) 3639-3654.

Cunningham et al: "Deep Residual Networks for Quantificationof Muscle Fiber Orientation and Curvature From Ultrasound Images"; MIUA 2017, CCIS 723, pp. 1-11, 2017.

Cunningham et al: "The Application of Deep Convolutional Neural Networks to Ultrasound for Modeling Dynamic States With Human Skeletal Muscle"; 2017, https://doi.org/10.1101/157479, 12 Page Document.

Cunningham et al: "Estimating Full Regional Skeletal Muscle Fibre Orientation From B-Mode Ultrasound Images Using Convoultional, Residual, and Deconvolutional Neural Networks"; Journal of Imaging, 2018, 4, 29,pp. 1-15.

Yin et al: "Three-Dimensional Shear Wave Elastography of Skeletal Muscle"; American Institute of Ultrasound in Medicine, 2018, vol. 37, pp. 2053-2062.

Gennisson et al: "Viscoelastic and Anisotropic Mechanical Properties of in Vivo Muscle Tissue Assessed By Supersonic Shear Imaging"; Ultrasound in Med & Biol. vol. 36, No. 5, pp. 789-801, 2010.

PCT/EP2019/072328 ISR & WO, Jan. 3, 2020, 17 Page Document.

He et al: "Mask R-CNN"; Facebook AI Research (Fair),arXiv:1703.06870v3, Jan. 24, 2018, pp. 1-12.

Lee et al: "Noninvasive Assessment of Myocardial Anisotropy in Vitro and in Vivo Using Supersonic Shear Wave Imaging"; IEEE 2010, pp. 690-693.

Ronneberger et al: "U-Net:Convolutional Networks for Biomedical Image Segmentation"; arXiv:1505.04597v1, May 18, 2015, pp. 1-9.

Wang et al: "Imaging Transverse Isotropic Properties of Muscle By Monitoring Acoustic Radiation Force Induced Shear Waves Using a 2-D Matrix Ultrasound Array"; IEEE Transactions on Medical Imaging, vol. 32, No. 9, Sep. 2013, pp. 1671-1684.

Yin et al: "Three-Dimensional Shear Wave Elastogrpahy of Skeletal Muscle: Preliminary Study"; J Ultrsound Med. Aug. 2018; 37(8);2053-2062.

* cited by examiner

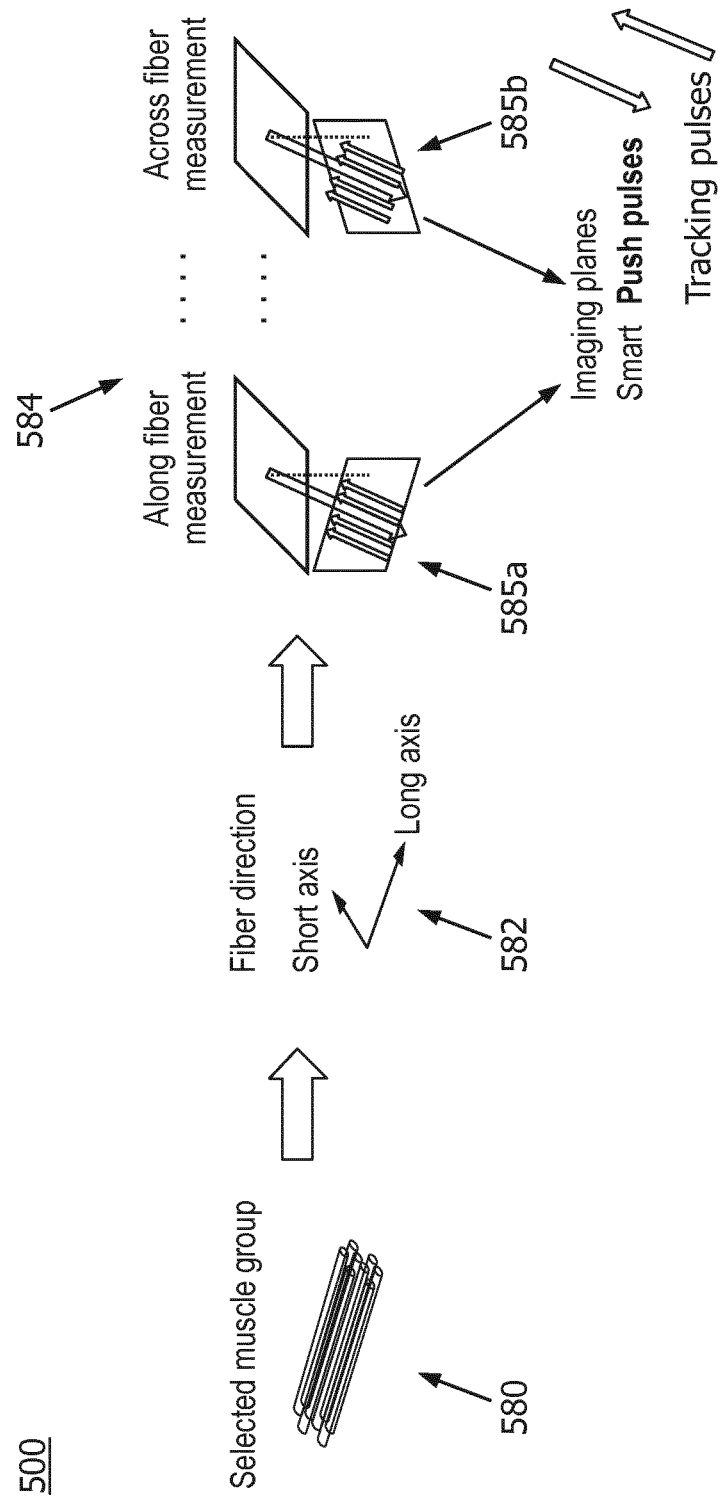

ULTRASOUND SYSTEM AND METHODS FOR SMART SHEAR WAVE ELASTOGRAPHY

CROSS-REFERENCE TO PRIOR APPLICATIONS

This application is the U.S. National Phase application under 35 U.S.C. § 371 of International Application No. PCT/EP2019/072328, filed on Aug. 21, 2019, which claims the benefit of U.S. Provisional Patent Application No. 62/724,076, filed on Aug. 29, 2018. These applications are hereby incorporated by reference herein.

TECHNICAL FIELD

The present disclosure pertains to ultrasound systems and methods for imaging anisotropic tissue with shear wave elastography by identifying fiber orientation in the anisotropic tissue and adjusting the shear wave elastography based on the identified fiber orientation.

BACKGROUND

An ultrasound imaging system, such as a cart-based ultrasound imaging system, typically includes a user interface, which operates in conjunction with a probe and a display to acquire and display images from a subject, such as a patient. The ultrasound imaging system may use shear wave elastography to determine mechanical properties of tissue. Shear wave elastography may be used for screening and diagnostic purposes such as to identify regions of abnormal stiffness in tissues, which may indicate the presence of, for example, a tumor. Shear wave elastography measurements may involve generating shear waves in the tissue and measuring the speed of the shear waves using ultrasound pulses generated by a transducer.

Different types of tissue have different properties. Certain types of tissue, such as liver tissue, may be generally isotropic, while certain other types of tissue, e.g., musculoskeletal, vascular wall, and myocardium tissue, may be anisotropic, where a property of the tissue (e.g., stiffness) may vary based on a direction along which that property is measured. The anisotropy of a tissue may be based on the orientation of fibers within that tissue. Shear wave measurements may thus be highly dependent on the orientation of the fibers relative to the orientation of the ultrasound pulses used for shear wave measurements. However, the orientation of the fibers may be unknown, while the placement of the transducer may be constrained by placement on the skin. Thus, it may be desirable to determine the location and orientation of the fibers relative to the transducer and adjust an angle of the ultrasound pulses accordingly for shear wave elastography. The examples described herein may provide solutions to one or more challenges in the field of smart shear wave elastography.

SUMMARY

In at least one embodiment, the present disclosure may be drawn to a method of smart shear wave elastography in anisotropic tissue. The method may include identifying muscle fiber structures from a 3D ultrasound image dataset. The method may include providing a representation of at least one identified muscle fiber structure relative to a surface of a transducer. The method may include selecting at least one of the identified muscle fiber structures. The method may include determining a target measurement plane based on an orientation of the selected muscle fiber structure. The method may also include transmitting ultrasound pulses in accordance with a sequence configured to perform shear wave imaging in the target measurement plane.

In another aspect, the present disclosure may be drawn to an ultrasound shear wave elastography system. The system may include a transducer and a processor. The transducer, may emit a push pulse and tracking pulses into a tissue. The processor may be coupled to the transducer. The processor may identify the location of muscle fiber structures based on a 3D dataset of the tissue. The processor may also, in response to a user selection of one of the muscle fiber structures, provide instructions to adjust an angle of the push pulse and the tracking pulses with respect to the tissue.

BRIEF DESCRIPTION OF THE DRAWINGS

FIG. 6 is a block diagram depicting an example report in accordance with some examples of the present disclosure.

DETAILED DESCRIPTION

Figure 1:
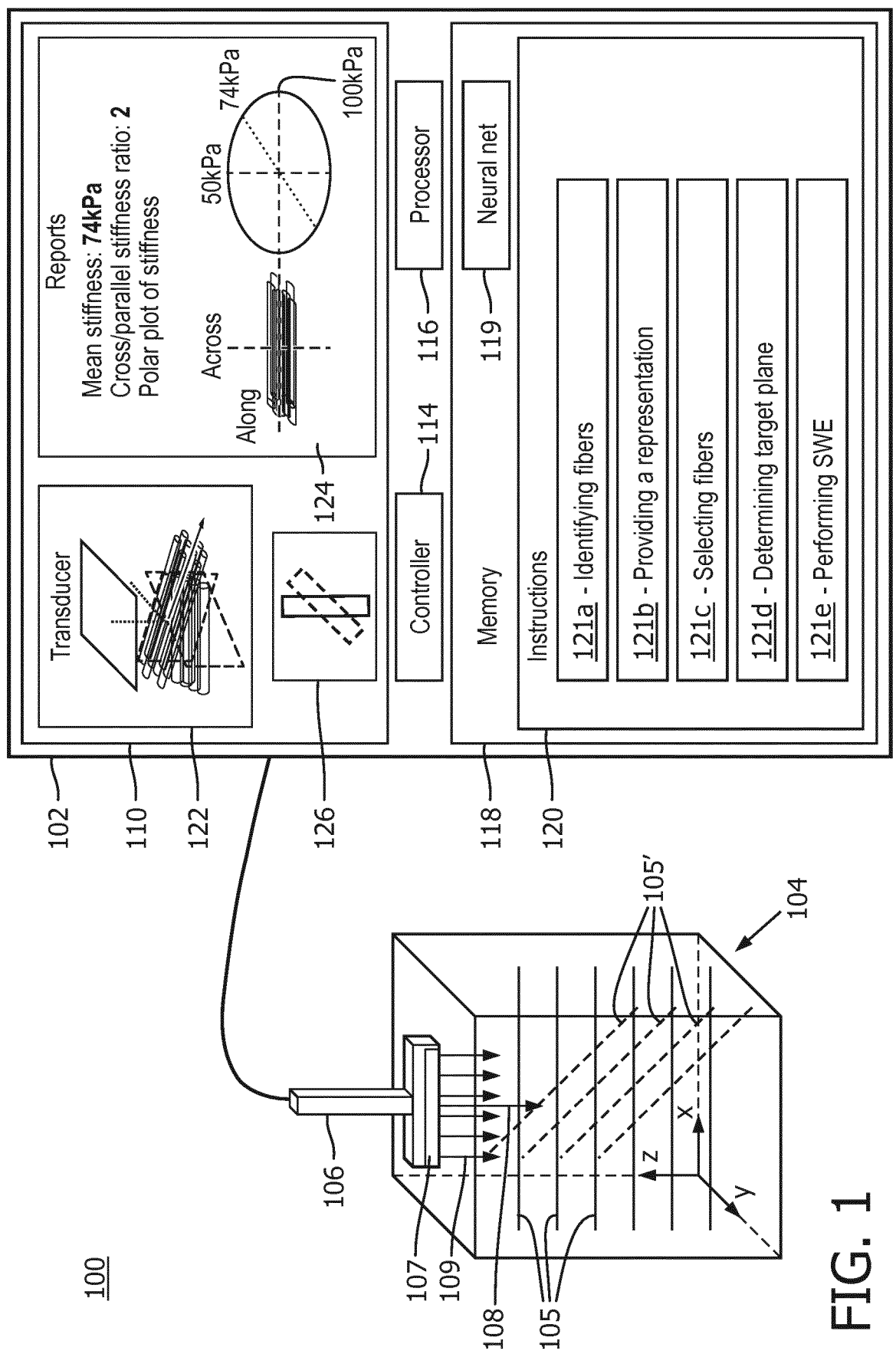
FIG. 1 is a block diagram of an operational environment for an ultrasound system in accordance with some examples of the present disclosure.

The following description of certain embodiments is merely exemplary in nature and is in no way intended to limit the invention or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the present system. Moreover, for the purpose of clarity, detailed descriptions of certain features will not be discussed when they would be apparent to those with skill in the art so as not to obscure the description of the present system. The following detailed description is therefore not to be taken in a limiting sense, and the scope of the present system is defined only by the appended claims.

The present technology is also described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer executable instructions. These computer executable instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Ultrasound shear wave elastography (SWE) conventionally assumes that shear waves propagate in isotropic materials, in other words the material mechanical properties are the same in all directions. However, certain tissues are anisotropic, and have different material mechanical properties along different directions. Some tissue, such as muscle tissue, is highly fibrous, and has anisotropic properties related to the orientation of fibers within the tissue. For example, there may be a minimum stiffness along a long axis of the fibers, and a maximum stiffness across (e.g., perpendicular to) the long axis of the fiber. The measured stiffness may vary between the maximum and minimum values at angles between the two extremes. Thus, when the orientation of the fibers with respect to the measurement is unknown, SWE measurements may be inconsistent and unreliable across different scanning sessions, tissues (e.g., biceps vs. calves) and/or users. As a result, SWE measurements may have low reproducibility, which may limit the use of SWE as a clinical tool in anisotropic tissues.

The apparatus, system, and method in accordance with embodiments of the present disclosure are directed to smart shear wave elastography that allows for identification of fibers in anisotropic tissue and adjustment of the shear wave elastography to account for an orientation of the identified fibers. A preliminary scan of the tissue is used to determine the location and orientation of fibers or fiber groupings in a region of interest of anisotropic tissue. A display may be generated showing the placement of fiber groupings relative to an ultrasound probe and/or the skin. One or more of the fiber groupings may be selected, and the system may adjust shear wave measurement parameters (e.g., a transmit angle of the transducer) based on the orientation of the selected fibers. The system may then collect SWE measurements of the selected fibers. The system may collect SWE measurements from multiple measurement planes about the selected fiber grouping.

FIG. 1 depicts an operational environment 100 associated with an ultrasound imaging system 102 according to some embodiments of the present disclosure. Components of the operational environment 100 may be used, at least in part, to implement embodiments of the present disclosure. The operational environment 100 includes an ultrasound imaging system 102 and a probe 106 coupled to the ultrasound system 102. The probe 106 may emit ultrasonic pulses 108, 109 which may be positioned to capture data from a region of anisotropic tissue 104 including fibers 105, 105'. The ultrasound system 102 may include a display 110, a controller 114, a processor 116, and a memory 118 including instructions 120. The instructions 120 may include one or more steps 121a-d, which may be operated by processor 116. The display 110 may produce one or more graphics, such as a fiber orientation display 122, report 124, and/or feedback display 126.

The probe 106 may be a handheld unit coupled to the ultrasound system 102. The probe 106 may be positioned on a surface of a subject (e.g., against the skin) near a region of anisotropic tissue 104. For clarity, probe 106 is shown in direct contact with anisotropic tissue 104, but there may be one or more additional tissues (e.g., bone, skin, fat, muscle, etc.) between the probe 106 and the anisotropic tissue 104 of interest. The probe may include transducer 107, which may selectively generate and record soundwaves. The transducer 107 may produce pulses of sound, such as push pulse 108 and tracking pulse 109. The pulses 108, 109 may be emitted by the transducer 107 along a transmit angle with respect to a surface (a face) of the transducer 107. The transmit angle may be the –angle between the axis the pulses 108, 109 are emitted along and a normal through the surface of the transducer 107. In some embodiments the transmit angle may be adjustable, such as with beam steering and/or mechanical movement of the transducers 107 within the probe 106. The probe 106 (and/or ultrasound system 102) may record data from a measurement (or imaging) plane defined by the orientation and placement of the pulses 108, 109. Although referred to as a plane herein, one of skill in the art would understand that the measurement plane may have a variety of shapes, such as sector, linear, curvilinear, trapezoidal, etc.

In some embodiments the transducer 107 may be a 1D transducer (e.g., a line of transducers). Since in the case of a 1D transducer, all the transducer elements may be along a line, the 1D transducer may measure along a single measurement plane defined by the line of the elements of the transducer 107. The probe 106 may be manually rotated and/or repositioned to change the orientation and/or location of the measurement plane with respect to the tissue 104. The transmit angle of the 1D transducer may be varied to sweep the measurement plane in the elevation direction.

In some embodiments, the transducer 107 may be a 2D array of transducers. The 2D array of transducers may allow for imaging of a 3D volume of the anisotropic tissue 104, rather than a single plane. The 2D array of transducers 107 may have groups of transducers selectively activated to generate multiple imaging planes at various orientations relative to the probe 106.

The probe 106 may be used to acquire a shear wave elastography (SWE) measurements of the anisotropic tissue 104. To that end, the probe 106 may include a transducer 107 which is operable to transmit a "push pulse" 108 toward the anisotropic tissue 104, generating a shear wave which then propagates through the anisotropic tissue 104. Alternatively, the shear wave in the tissue may be generated without acoustic radiation force but via mechanical force applied externally to the tissue, such as by a mechanical vibrator configured to compress the tissue. The transducer 107 may be further operable to emit tracking pulses 109, which may be used to measure the velocity of the shear wave as it propagates. There may be a plurality of tracking pulses 109 at regular (or semi-regular) spacing between the tracking pulses 109. The tracking pulses 109 and the push pulse 108 may be co-planar with each other to define the measurement plane from which SWE measurements are taken. The measured velocity of the shear wave may be analyzed (such as by processor 116) to determine a stiffness of the anisotropic tissue 104 along a direction defined by the plane of the tracking pulses 109. The shear wave elastography measurements may be used to produce a shear wave elastography image.

The anisotropic tissue 104 may have anisotropic properties (e.g., stiffness) which vary based on the orientation of fibers 105, 105' in the tissue 104. FIG. 1 shows a simplified view of an anisotropic tissue 104 with two groupings of fibers 105 and 105'. The groupings of fibers may correspond to anatomical features (e.g., muscle fiber bundles) of the tissue. Each grouping of fibers 105, 105' may include individual fibers which generally run in the same direction. Although shown in the simplified view of FIG. 1 as parallel to each other, it is to be understood that the individual fibers of a fiber grouping 105, 105' may each have slightly different directions. The fiber groupings 105, 105' may have a location (e.g., x, y, and z coordinates) and an orientation (e.g., rotation in 3D space of the long axis of the fibers) within the tissue. The fibers 105, 105' may change location and orientation between patients and/or over time. In some embodiments where the fibers 105, 105' are muscle fibers, they may also change due to a contraction/relaxation state of the muscle.

The first grouping of fibers 105 may run generally parallel to a surface of the anisotropic tissue 104 where the probe 106 is positioned. The probe 106 may be positioned such that the push pulse 108 is roughly perpendicular to the fibers 105, and the tracking pulses are perpendicular to the fibers 105 and lie along a plane which is generally aligned with the long axis of the fibers 105. The push pulse 108 may therefore intersect the first fiber grouping 105 at a right angle and may generate a shear wave with a wave front that is perpendicular to the fibers 105 and parallel to the push beam 108.

The second grouping of fibers 105' may lie at an angle to the surface of the tissue (e.g., an angle in the x-z plane) and an angle to the placement of the transducer 106 (e.g., an angle in the x-y plane). In order to reliably measure the stiffness of the second grouping of fibers 105', it may be necessary to adjust the position and angle of the push and tracking pulses 108, 109 such that they are perpendicular to the second grouping of fibers 105' and aligned with a long axis of the second grouping of fibers 105'. The adjustment of the position and angle may involve one or more of physical adjustment of the probe 106 and/or adjustment of the pulses 108, 109 relative to the position of the probe 106 (e.g., with beam steering, selective activation of elements of a 2D transducer array, physical movement of the transducer 107 within the probe 106). As described herein, the system 102 may determine a location of the fibers 105, 105' and may produce instructions to adjust the direction of the push and tracking pulses 108, 109 such that the push and tracking pulses 108, 109 are perpendicular to the long axis of the muscle fibers 105, 105'. The instructions may be used either for automatic and/or manual adjustment (e.g., by providing feedback to a user of the system 102). For ease of illustration the two groupings of fibers 105, 105' are both shown as having long axis which are linear, however some fibers may have a long axis which is not a line. Accordingly the fibers may come in and out of an imaging plane. In some embodiments the instructions may adjust the angle of the push and tracking pulses 108, 109 to remain perpendicular to the long axis of the fiber as the direction of that long axis changes along the length of the fiber.

As well as collecting measurements when the tracking pulses 109 lie along a plane aligned with a long axis of the fibers 105, 105', it may be desirable to collect measurements from measurement planes at additional angles with respect to the long axis of the fibers 105, 105'. The push and tracking pulses 108, 109 may still be adjusted to remain perpendicular to the fibers 105, 105' at these measurement planes. In some embodiments, the system 102 may produce instructions for a first measurement where the measurement plane is parallel to the long axis of the fibers 105, 105' (e.g., along the fibers), and produce instructions for a second measurement where the measurement plane is perpendicular to the long axis of the fibers 105, 105' (e.g., across the fibers). In some embodiments, the system 102 may produce instructions for a plurality of measurements, where each of the measurement planes is at a different angle between the tracking pulses 109 and the long axis of the fibers 105, 105'. In one example, the system 102 may direct measurements at a set angular spacing, such as a measurement every 5° from 0° to 90°. Other intervals and ranges may be used in other examples.

The ultrasound system 102 is coupled to the probe 106 to receive and process data therefrom and to direct operation of the probe 106. The ultrasound system 102 may be directly coupled to the probe 106 (e.g., with a cable), or may be coupled via a wireless connection (e.g., Wi-Fi, Bluetooth). The ultrasound system 102 may include a controller 114 to direct operation of the probe 106. The ultrasound system 102 may include a memory 118 which may hold instructions 120. The instructions 120 may be operated by the processor 116 to cause the controller 114 to direct the probe 106 to operate in specific ways. The processor 116 may also operate the instructions 120 to read and/or analyze data from the probe and/or to produce feedback or reports for a user of the system 102.

The system 102 may include a display 110 to provide data and/or feedback to a user of the system 102. The display 110 may display one or more graphics to direct operation of the system 102 or to provide results. The display 110 may produce a fiber orientation display 122. The fiber orientation display 122 may be a graphical representation of one or more groups of fibers (e.g., fiber groupings 105, 105') with respect to the transducer 107 and/or tissue 104. The system 102 may include one or more user controls (e.g., mouse, keyboard, touchscreen, etc.) that may allow a user to select one of the groups of fibers on the fiber orientation display 122 for further measurement. The system may produce instructions to adjust the angle of the push and tracking pulses 108, 109 based on the selected group of fibers.

The display may show one or more reports 124 produced by the system 102, which may present data based on the SWE measurements of the tissue 104. The reports 124 may indicate if one or more SWE measurements are abnormal, and may alert a user (e.g., via a tone, a text box, a color of the graphic, etc.). The display 110 may also produce additional graphics, such as a feedback display 126. The feedback display 126 may be used to provide feedback to a user of the system 102. In some embodiments, the feedback display 126 may be used to guide positioning of the probe 106 to adjust the angles of the push and track pulses 108, 109 with respect to the fibers 105, 105'. In some embodiments where the system 102 automatically adjusts the push and tracking pulses 108, 109, the feedback display 126 may not be used. In some embodiments, the information of the fiber orientation display 122, report 124, and/or feedback display 126 may be combined into a single graphic.

The memory 118 may include instructions 120 which may be operated by the processor 116 to cause the system 102 and/or probe 106 to perform specific actions. The memory may include neural network 119, which may be accessed by the processor 116 in response to one or more of the instructions 120. The neural network 119 may be previously trained and/or the memory 118 may include additional training data for the neural network 119. The memory 118 may also include additional information (e.g., equations, constants, data, etc.). The instructions 120 may include steps, such as steps 121a-d, which may be operated to carry out SWE measurements in tissue 104. Although certain steps 121a-121e are described here, it should be understood that the instructions 120 could be loaded with different steps. Similarly, certain steps may be omitted or repeated, and additional steps may be added.

Step 121a may cause the processor to identify fibers in the tissue. The processor 116 may direct the controller 114 and/or a user of the system (e.g., via display 110) to perform an initial scan of the tissue 104 to produce a 3D data set, which may be saved in the memory 118. The 3D dataset may be analyzed by the processor 116 to identify the location and orientation of fibers or groups of fibers in the tissue 104. The neural network 119 may be used to determine the location and/or orientation of the fibers in the 3D data set. The neural network may generally be a machine learning algorithm, and in some embodiments may be a deep learning algorithm. The neural network 119 may be trained on a training set of data, which may include identified fiber structures. In some embodiments, the memory 118 may include multiple neural networks 119 which may be trained on different training data sets (e.g., corresponding to different tissue types, pathologies, etc.). In some embodiments, the memory 118 may include neural networks of different types.

Step 121b may be operated by the processor 116 to provide a representation of the identified fibers. The provided representation may be a graphic, such as the fiber orientation display 122. The representation may be used to select a fiber or group of fibers for further measurement.

Step 121c may be operated by the processor 116 to select one or more of the groups of fibers identified in step 121a. In some embodiments a user may be prompted to select one or more groups in the representation provided by step 121b. In some embodiments the system (e.g., processor 116) may automatically select one or more of the groups of fibers.

Step 121d may be operated by the processor 116 to determine a target measurement plane. The target measurement plane may be determined based on the orientation of the fibers selected in step 121c. The system 102 (e.g., via controller 114) may direct push and tracking pulses 108, 109 such that measurement are recorded from the target measurement plane. In some embodiments, the system may adjust a transmit angle of the push and tracking pulses 108, 109. The processor 116 may calculate an angle between the transducer 107 and the selected fibers and may produce instructions for adjusting the angle of the ultrasound pulses 108, 109 such that they are perpendicular to the long axis of the selected fibers. The instructions may be operated by the probe and/or controller 114 to automatically adjust the angle, or the instructions may be used to produce feedback display 126 to guide manual adjustment of the angle. In some embodiments multiple target measurement planes may be generated.

Step 121e may be operated by the processor 116 to cause the controller 114 to direct the transducer 107 to begin producing push and tracking pulses 108, 109. The transducer 107 may measure echoes generated from the pulses, which may be recorded in the memory 118. The processor 116 may analyze the recorded echo data to determine stiffness in the tissue 104. The processor 116 may produce one or more images based on the analyzed echo data. One or more additional parameters (e.g., fiber orientation, acquisition time, patient name, etc.) may be stored in the memory 118 along with the recorded echo data. In some embodiments, the processor 116 may direct measurement along a plurality of different measurement planes (e.g., via automatic adjustment with controller 114, or manual adjustment by providing feedback display 126).

Figure 2:
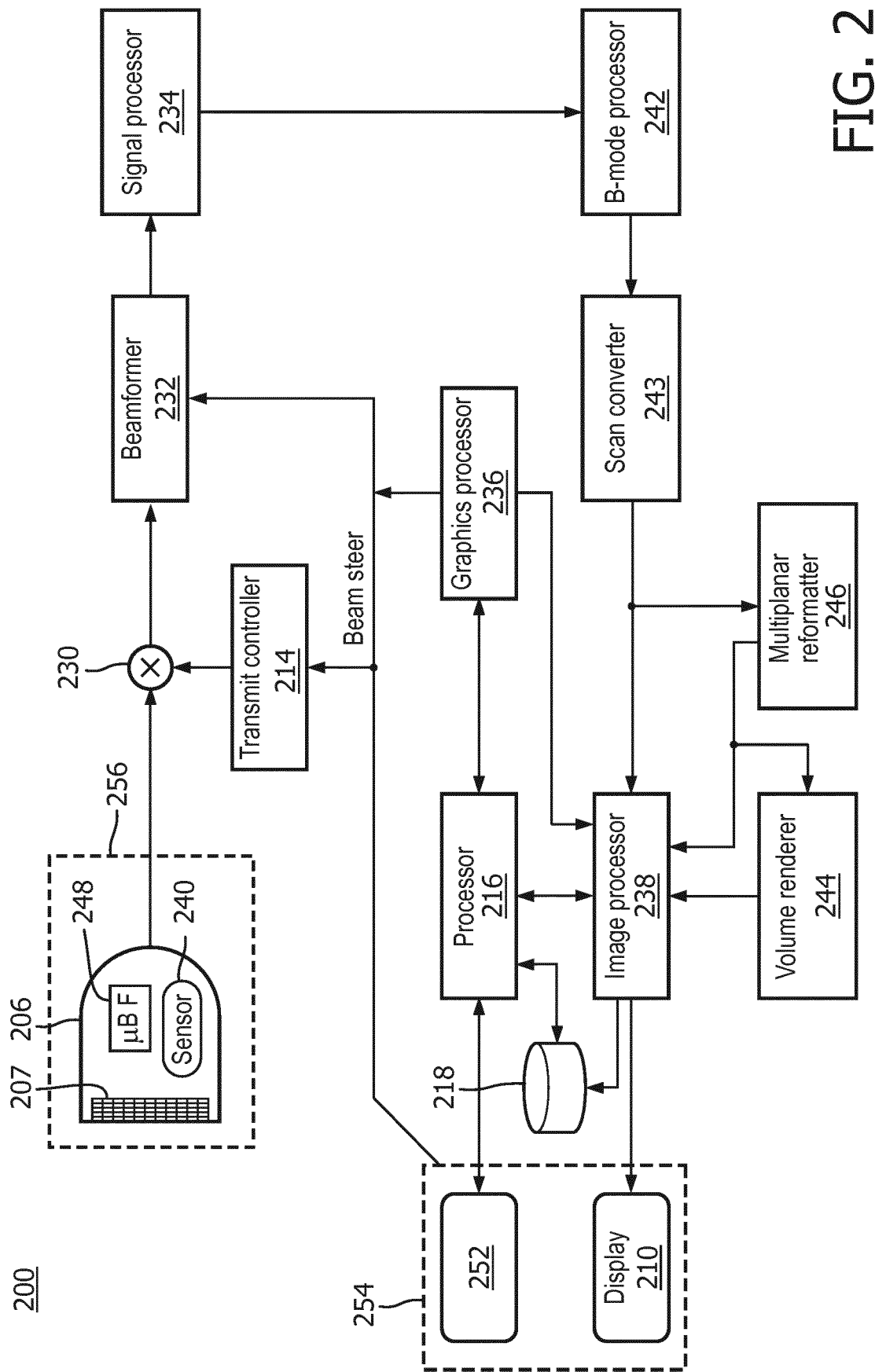
FIG. 2 is a block diagram of an ultrasound system in accordance with some examples of the present disclosure.

FIG. 2 shows a block diagram of an ultrasound imaging system 200 according to some embodiments of the present disclosure. The ultrasound imaging system 200 may be used to implement, at least in part, the ultrasound system 102 and probe 106 of FIG. 1. FIG. 2 shows an ultrasound imaging system 200, which includes a handheld unit 256, which may include an ultrasound probe 206, a transducer array 207, microbeamformer 248, and one or more sensors 240. The ultrasound system 200 may also include a transmit/receive (T/R) switch 230, beamformer 232, transmit controller 214, signal processor 234, B-mode processor 242, scan converter 243, multiplanar reformatter 246, volume renderer 244, image processor 238, graphics processor 236, user interface 254, input device 252, and output device 210. The components shown in FIG. 2 are merely illustrative, and other variations, including eliminating components, combining components, rearranging components, and substituting components are all contemplated.

The ultrasound imaging system 200 includes a probe 206, which may be used to implement the probe 106 of FIG. 1 in some embodiments. The probe 206 is positioned about a subject and used to capture data about tissues of the subject (e.g., anisotropic tissue 104 of FIG. 1). In the ultrasound imaging system 200 in FIG. 2, the ultrasound probe 206 includes a transducer array 207 for transmitting ultrasonic waves and receiving echo information. A variety of transducer arrays are well known in the art, e.g., linear arrays, convex arrays or phased arrays. The transducer array 207 for example, can include a two dimensional array of transducer elements capable of scanning in both elevation and azimuth dimensions for 2D and/or 3D imaging. The transducer array 207 is coupled to a microbeamformer 248, typically located in the ultrasound probe 206, which controls transmission and reception of signals by the transducer elements in the array. In this example, the microbeamformer 248 is coupled, such as by a probe cable or wirelessly, to a transmit/receive T/R switch 230, which switches between transmission and reception. The T/R switch 230 may thus protect the beamformer 232 from high energy transmit signals. In some embodiments, the T/R switch 230 and other elements of the system 200 can be included in the handheld unit 256 rather than in a separate ultrasound system base (e.g., ultrasound system 102 of FIG. 1).

The transmission of ultrasonic pulses (e.g., beams) from the transducer array 207 under control of the microbeamformer 248 is directed by the transmit controller 214 coupled to the T/R switch 230 and the beamformer 232. The transmit controller 214 receives input from the user's operation of an input device 252 of user interface 254. The transmit controller 214 may be a component of an ultrasound system base, or may be a general controller of the ultrasound system (e.g., controller 114 of FIG. 1). The user interface 254 may be implemented using one or more input devices 252, such as control panels, which may include soft and/or hard controls, and output devices 210, such as one or more displays (e.g., display 110 of FIG. 1), as described further below. One of the functions controlled by the transmit controller 214 is the direction in which pulses are steered. Pulses may be steered straight ahead from (orthogonal to) the transducer array, or at different angles for a wider field of view. In some embodiments the pulses may leave the transducer array at a common transmit angle. The partially beamformed signals produced by the microbeamformer 248 are coupled to a beamformer 232 where partially beamformed signals from individual patches of transducer elements are combined into a fully beamformed signal. The transmit controller 214 may record a position of the pulses with respect to the probe 206 and transducer 207. As described herein, the position of the pulses may be used to determine an orientation of an imaging plane with respect to the tissue.

The beamformed signals may be coupled to a signal processor 234. The signal processor 234 can process the received echo signals in various ways, such as bandpass filtering, decimation, I and Q component separation, and harmonic signal separation. The signal processor 234 may also perform additional signal enhancement such as speckle reduction, signal compounding, and noise elimination. The processed signals may be coupled to a B-mode processor 242, which can employ amplitude detection for the imaging of structures in the body. The signals produced by the B-mode processor may be coupled to a scan converter 243 and a multiplanar reformatter 246. The scan converter 243 arranges the echo signals in the spatial relationship from which they were received in a desired image format. For instance, the scan converter 243 may arrange the echo signal into a two dimensional (2D) sector-shaped format, or a pyramidal three dimensional (3D) image. The multiplanar reformatter 246 can convert echoes, which are received from points in a common plane in a volumetric region of the body into an ultrasonic image of that plane, as described in U.S. Pat. No. 6,443,896 (Detmer). A volume renderer 244 converts the echo signals of a 3D data set into a projected 3D image as viewed from a given reference point, e.g., as described in U.S. Pat. No. 6,530,885 (Entrekin et al.) The 2D or 3D images may be coupled from the scan converter 243, multiplanar reformatter 246, and volume renderer 244 to an image processor 238 for further enhancement, buffering and temporary storage for display on an output device 210. The output device 210 may include a display device implemented using a variety of known display technologies, such as LCD, LED, OLED, or plasma display technology.

The graphics processor 236 can generate graphic overlays for display with the ultrasound images. These graphic overlays may contain, for example, standard identifying information such as patient name, date and time of the image, imaging parameters, and the like. The graphics processor 236 may receive input, such as a typed patient name, from the input device 252. The graphics processor may generate one or more displays based on data collected by the probe 206 and/or stored in the memory 218 such as the fiber orientation display 122, report 124, and/or feedback display 126 of FIG. 1. The input device 252 may include one or more mechanical controls, such as buttons, dials, a trackball, a physical keyboard, and others, which may also be referred to herein as hard controls. Alternatively or additionally, the input device 252 may include one or more soft controls, such as buttons, menus, soft keyboard, and other user interface control elements implemented for example using touch-sensitive technology (e.g., resistive, capacitive, or optical touch screens). To that end, the ultrasound imaging system 200 may include a user interface processor (i.e., processor 216), which may control operations of the user interface such as functions associated with soft controls. One or more of the user controls may be co-located on a control panel. For example, one or more of the mechanical controls may be provided on a console and/or one or more soft controls may be co-located on a touch screen, which may be attached to or integral with the console. For example, in some embodiments the input device 252 may be part of the display 110 of FIG. 1.

The ultrasound images and associated graphics overlays may be stored in memory 218, for example for off-line analysis. In addition, the memory 218 may store processor-executable instructions including instructions for performing functions associated with the user interface 254. In some embodiments, the user interface 254 may include a graphical user interface, which may be configured to display, responsive to a processor of the system 200, graphical user interface elements for providing guidance to the sonographer in performing shear wave elastography of anisotropic tissue in accordance with any of the examples herein. The memory 218 may be a part of an ultrasound base unit, or may be a general memory that is part of a computer system coupled to the base unit (e.g., the memory 218 may be memory 118 of ultrasound system 102 of FIG. 1). The user interface 254 can also be coupled to the multiplanar reformatter 246 for selection and control of a display of multiple multiplanar reformatted (MPR) images. In some examples, functionality of two or more of the processing components (e.g., beamformer 232, signal processor 234, B-mode processor 242, scan converter 243, multiplanar reformatter 246, volume renderer 244, image processor 238, graphics processor 236, processor 216, etc.) may be combined into a single processing unit such as processor 116 of FIG. 1.

The probe 206, sensor 240, microbeamformer 248, and transducer 250 may be combined into a handheld unit 256. The handheld unit 256 may be shaped to be held in a user's hand. The handheld unit 256 may have a 'head' or 'face' containing the transducer 250 and shaped to be positioned on a surface of a subject (e.g., against the skin). The sensor 240 may record properties of the probe 206, such as its rotational orientation or location in space. Although only a single sensor 240 is show in FIG. 2, it is to be understood that the sensor 240 may represent a plurality of sensors positioned about the probe 240. The sensor 240 may be integral, such as contained within a housing of the probe 206, may be a separate component attached to an outside of a housing of the probe 206, or may be a combination of integral and combined. The sensor 240 may be located in a fixed position relative to the probe 206, so that by knowing a position of the sensor 240, a position of the probe 206 and imaging plane is also known.

Figure 3:
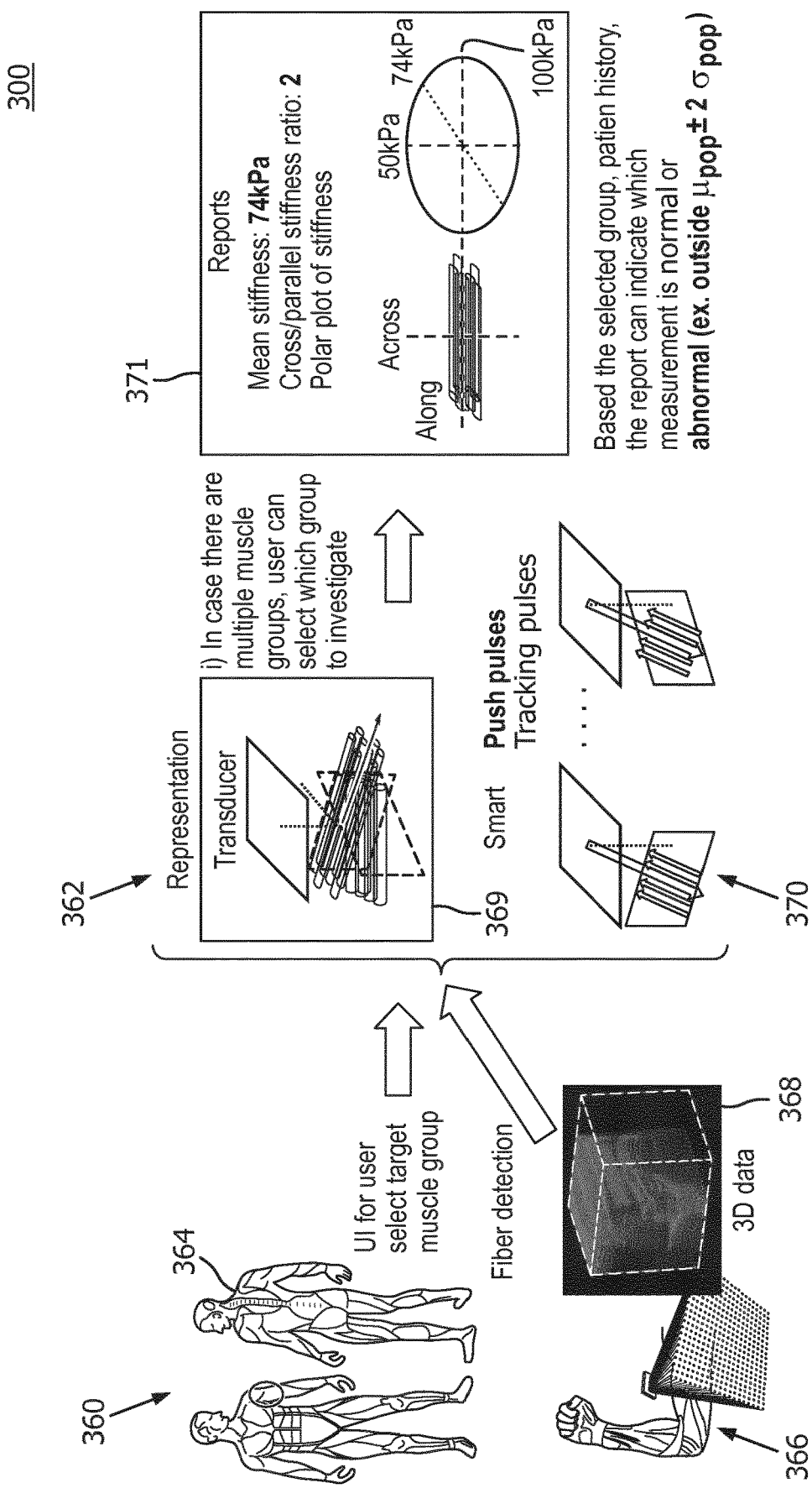
FIG. 3 is a block diagram of a method of smart shear wave elastography in accordance with some examples of the present disclosure.

FIG. 3 is a block diagram of a method of smart shear wave elastography in accordance with some examples of the present disclosure. The method 300 is shown as a simplified series of diagrams, each representing one or more steps in the process of shear wave elastography. The method 300, in some embodiments, may be implemented by machine readable instructions (e.g., instructions 120 of FIG. 1) of an ultrasound system (e.g., ultrasound system 102 and probe 106 of FIG. 1). Although certain steps will be described in regards to FIG. 3, it should be understood that other embodiments may use more or fewer steps. Certain steps of FIG. 3 may be repeated. FIG. 3 includes step 360—determining fiber orientation, which involves step 364—selecting a region of interest, step 366—collecting a 3D data set, and step 368—detecting fibers within the 3D data set. The method 300 also includes step 362—performing smart SWE measurements which involves step 369—selecting a fiber bundle and step 370—collecting SWE measurements. The method 300 also includes step 371—providing a report of the measurements.

Step 360 involves determining the fiber orientation within a region of interest. In step 364 a region of interest is selected. In some embodiments, this may involve presenting a user interface (e.g., on display 120 of FIG. 1) of different muscle groups. A user may select a target muscle group. In some embodiments, the system may direct placement of a probe (e.g., probe 106 of FIG. 1) against the tissue based on the selected muscle group.

In step 366 a 3D data set of the tissue is collected. In some embodiments, the probe may have a 2D array of transducers and a 3D image may be collected of a target region of tissue to generate the 3D data set. In some embodiments, the probe may not be capable of 3D imaging, and the probe must be moved across the tissue to build a 3D data set from a plurality of 2D images. In some embodiments the 3D data set may be composed of data from B-mode ultrasound images of the tissue.

In step 368 the location and orientation of fibers within the 3D data set are detected. The fibers may be segmented in the 3D data set using automatic or semi-automatic methods, such as region growing algorithms, adaptive thresholding, manual delineation, statistical deformable model-based segmentation, appropriately trained artificial neural networks, such as deep learning type networks, or combinations thereof. In some embodiments, a deep learning network such as Mask R-CNN, SegNet, U-Net, and/or others may be used. The deep learning network may be trained using a training data set. The training data set may include previously acquired images, which may be 2D images, 3D images, or both. If the training data includes 2D images, the 3D data set collected in step 366 may be split into multiple 2D data sets for analysis. The training data set may incorporate various muscle types and locations, images from patients of different ages and genders, and may include images with abnormalities (e.g., diseased tissue). In some embodiments, the deep learning network may be trained based on training data corresponding to the muscle group selected in step 364. The training data may include corresponding ground-truth labels to identify the fiber groupings, abnormalities, and/or other features within each image of the training data.

The method 300 may include step 362, performing smart SWE measurements. The system may use information about the identified fibers (e.g., their angle(s) relative to the transducer) to produce instructions for adjusting the SWE measurement. The step 362 includes step 369 which involves selecting a fiber group for SWE measurement. Multiple fiber groups may be detected in the tissue during step 368. The fibers may be grouped together by the system (e.g., grouped together by the deep learning algorithm) based on sharing a similar direction and/or other anatomical features. Each of the different fiber groups may have a different location and/or orientation. A single fiber group may be selected for SWE measurement, or multiple of different fiber groups may be selected. In some embodiments where multiple different fiber groups are selected, the system may perform SWE measurements for each fiber group in sequence (e.g., step 370 may be repeated for each of the selected fiber groups). In some embodiments, the fiber group for SWE measurement may be selected automatically. In some embodiments, a user may select the fiber group. In some embodiments, the system may produce a display of the fiber group(s) relative to the transducer and/or tissue (e.g., fiber orientation display 122 of FIG. 1).

Each fiber of a fiber group may have a slightly different direction (e.g., the fibers of the fiber group are not parallel to each other). In this case, the system may determine an overall fiber orientation for use in subsequent steps. The overall fiber orientation may be calculated from the individual fiber orientations of the group. In one example the system may determine an orientation of the long axis of each detected fiber of a fiber group. The system may produce a unit along this orientation, and may calculate the mean of the unit vectors for each fiber of the group to determine the overall orientation of the long axis of the fiber group. Different methods to calculate the overall orientation of a fiber group may be used in other examples.

Once a fiber group has been selected, the method 300 may continue with step 370, which involves collecting SWE measurements. Once a particular fiber group has been selected, the system may use information about that fiber group to adjust SWE measurement parameters. The SWE measurement may be adjusted such that SWE measurements are collected in one or more measurement planes. For example, based on an angle between the selected fiber group and the transducer, the transmit angle of the transducer may be changed so that the push and tracking pulses are perpendicular with the fiber bundle. The system may also produce instructions for aligning the plane of the tracking pulses with a particular angle to the long axis of the fiber bundle. For example, the system may produce instructions for aligning the plane of the tracking pulses along the fiber bundle and across the fiber bundle. In an example embodiment where the probe includes a 1D transducer, the instructions may be used for manual adjustment of the transducer to adjust the push and tracking pulses relative to the fibers of the tissue. In an example embodiment where the probe includes a 2D transducer, the system may automatically adjust the push and tracking pulses. Other angles and/or additional angles of alignment may be specified in other examples. In some embodiments, the system may generate a sequence of target measurement planes, and may collect SWE measurements along each of the measurement planes in the sequence. The instructions may be used automatically by a system, and/or may be provided to a user of the system for manual adjustment.

In step 371, one or more of the SWE measurements collected in the method 300 are compiled into a report. The report may include raw SWE measurements, information calculated from the SWE measurements, additional information, or combinations thereof. The report may include text elements, graphs, graphical representations (e.g., of the tissue), or combinations thereof. The report may be presented to a user and/or saved by the system (e.g., in memory 118 of FIG. 1). The report may indicate if abnormal conditions are detected (e.g., if a stiffness measurement is outside of a normal clinical range).

Figure 4:
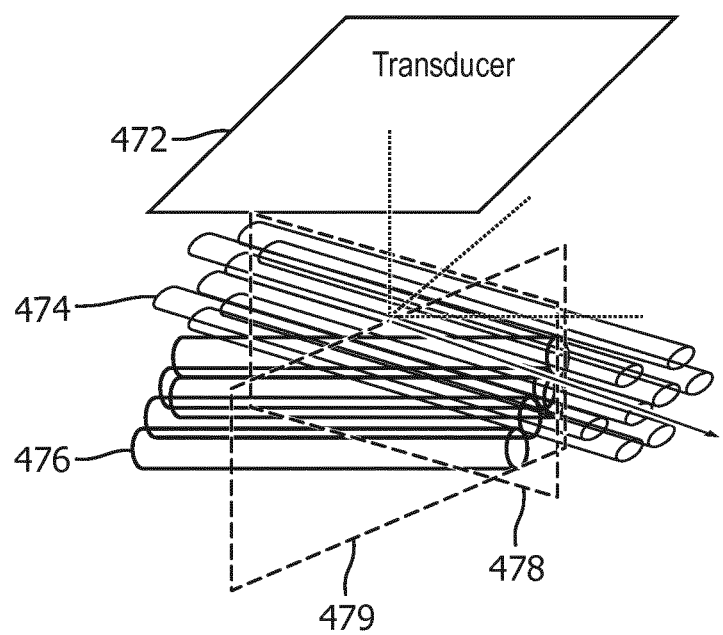
FIG. 4 is a block diagram of an example display of identified muscle fiber bundles in accordance with some examples of the present disclosure.

FIG. 4 is a block diagram of an example display of identified muscle fiber bundles in accordance with some examples of the present disclosure. The display 422 may be used to implement the fiber orientation display 122 of FIG. 1 in some embodiments. The display 422 includes a transducer indicator 472, a first fiber group indicator 474, a second fiber group indicator 476 and a first and second measurement plane indicator 478 and 479. For clarity only two fiber group indicators 474 and 476 and two measurement plane indicators 478 and 479 are shown in FIG. 4, however more or less fiber groups and measurement planes may be displayed. The display 422 shown in FIG. 4 is a simplified example display, and other displays may use different graphical elements or different graphical styles to indicate the position and orientation of the fibers without departing from the present disclosure.

The display 422 may include a transducer indicator 472, which may represent a position of the transducer. The transducer indicator may be a representation of the transducer and/or probe, or may be a general shape or indicator (e.g., a rectangle, a line). In some embodiments, the transducer indicator may be a representation of a face of the transducer or a 'footprint' of the transducer on the skin. As shown in FIG. 4, the transducer is a 2D array transducer, and the footprint of the transducer is represented as a quadrilateral.

The display 422 may include one or more fiber group indicators 474, 476. In the particular example shown in FIG. 4, there is a first fiber group indicator 474 and a second fiber group indicator 476. The fiber group indicators 474, 476 may be a simplified representation of groups of fibers (e.g., muscle fiber bundles) in the tissue. The position and number of fiber group indicators 474, 476 may correspond to the number and position of fiber groups detected by the system. In some embodiments, only selected fiber groups are displayed. The fiber groups may be represented as a realistic depiction of the muscle fibers, or may represented schematically (e.g., as a cartoon and/or with simple shapes). In some embodiments, an image of the tissue (e.g., a B-mode ultrasound image of the tissue) may be displayed, and the fiber group indicators 474, 476 may be overlaid on it. In some embodiments the image of the tissue may be one of the images collected as part of the 3D data set (e.g., from step 360 of FIG. 3). In some embodiments the image of the tissue may be a rendering of a 3D B-mode image. In some embodiments the fiber group indicators 474, 476 may be depicted against an empty or neutral background. In the example shown in FIG. 4, the fiber groups are represented as a collection of cylinders. In some embodiments, where more than one fiber group is simultaneously displayed, the display 422 may distinguish between the fiber group indicators by varying, for example, color, line thickness, dashed lines, text labels, etc.

The fiber group indicators 474, 476 may have a position and orientation relative to the transducer indicator 472 to represent a position and orientation of the fiber bundles to the transducer. The position and orientation represent the position and orientation determined by the system (e.g., in step 360 of FIG. 3). In some embodiments, the system may calculate an overall position and/or orientation of the fiber group (e.g., by taking an average). The overall orientation and position may be displayed in addition to (or instead of) the position and orientation of the fibers. As shown in the example of FIG. 4, the overall position and orientation is indicated by an arrow overlaid on the first fiber group indicator 474.

A user of the system may interact with the display 422 to select one or more of the fiber groups. If multiple groups are selected, the system may determine a sequence in which to collect SWE measurements from the fiber groups. In some embodiments, the user may directly interact with the display 422 by, for example, clicking on one of the fiber group indicators 474, 476 with a mouse, or by tapping one of the fiber group indicators 474, 476 if the display 422 is presented on a touchscreen. The user may also be able to interact with the display 422 in order to, for example, change the viewing angle of the display 422, zoom in on different regions of the display, turn additional information such as legends, reference axes, etc. on and off and other ways of manipulating the display.

Once a fiber group is selected, the system may generate instructions to adjust the transmit angle such that the tracking and push pulses are perpendicular to the selected fiber group. The display 422 may update to show a representation of the transmit angle. The representation may be, for example, a line drawn from the transducer indicator 474 to the fiber indicator 474. In some embodiments, a user of the system may be able to interact with the display 422 to update and/or override the calculated transmit angle.

The display 422 may include measurement plane indicators 478, 479, which may be displayed in relation to a selected fiber group. The measurement planes may be represented by geometric shapes (e.g., rectangle, quadrilaterals, etc.) and may have a variety of colors, borders, fills, etc. FIG. 4 shows an example embodiment where the system is presenting two measurement plane indicators, a parallel plane indicator 478 aligned along the long axis of the selected fiber group 474, and a perpendicular plane indicator 479 aligned across the long axis of the selected fiber group 474. The measurement plane indicators 478, 479 may indicate planes along which the system collects SWE measurements. A user may be able to interact with the system to adjust the measurement planes for example by changing the number and/or positioning of the measurement plane(s). Once the transmit angle and measurement planes have been determined, the display 422 may prompt a user to proceed with SWE measurements.

Figure 5:
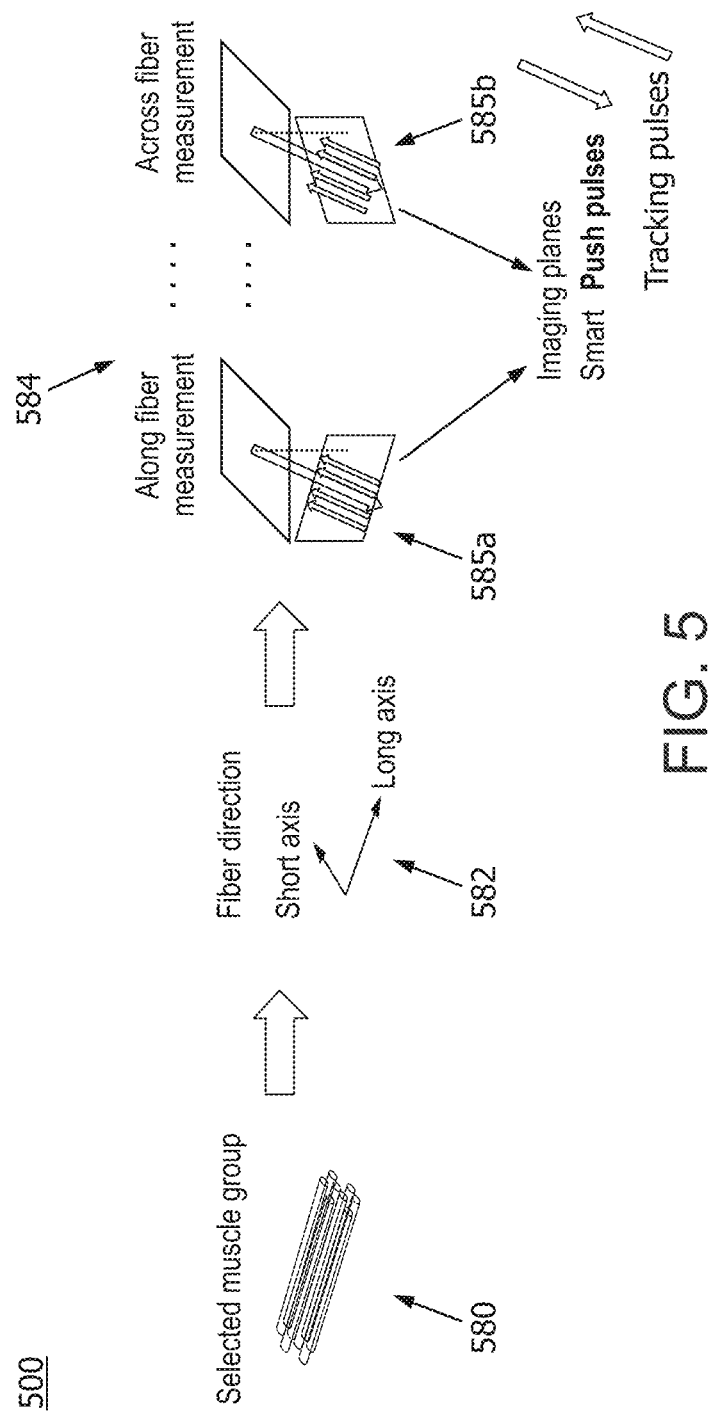
FIG. 5 is a block diagram depicting a method of collecting smart shear wave elastography measurements in accordance with some examples of the present disclosure.

FIG. 5 is a block diagram depicting a method of collecting smart shear wave elastography measurements in accordance with some examples of the present disclosure. The method 500 may, in some embodiments, be an implementation of the step 370 of FIG. 3. The method 500 may include step 580—selecting a fiber group, step 582—determining measurement planes, and step 584—directing SWE measurements along the determined measurement planes. The method 500 may contain more or fewer steps, and certain steps may be repeated. The method may be implemented on a system (e.g., system 102 of FIG. 1) as a series of machine readable instructions. The method 500 may interact with a display (e.g., fiber orientation display 122 of FIG. 1) and the display may be updated as the method 500 progresses.

The method 500 may include step 580 which involves selecting a fiber group. In some embodiments the fiber group may be selected by a user. In some embodiments the fiber group may be selected automatically (e.g., by processor 116 of FIG. 1). The selected fiber group may have a location and orientation with respect to the transducer. The location and orientation may have been previously determined (e.g., by step 360 of FIG. 3).

The method 500 may include step 582 which involves determining measurement planes. Once a fiber group is selected, the system may determine an orientation of one or more measurement planes with respect to the selected fiber group. The system may determine the position and location of an axis along the long axis of the fiber. In some embodiments where multiple fibers that are part of the same group have slightly different directions, the overall axis may be determined as the average (mean) of the unit vectors along the long axis of each of the fibers. The system may also determine a transmit line that is perpendicular to the long axis of the fiber and intersects the transducer. In the embodiment where the probe is set up for a sector scan, the transmit line may intersect the scan vertex. In the embodiment where the probe is set up for a linear scan, the transmit line may intersect the scan line that is closest to the long axis of the fiber.

The system may generate instructions for adjustment such that the transmit angle (e.g., the angle of the push and tracking pulses 108, 109 with respect to the surface of the transducer) may be along, or parallel to, the transmit line. In some cases, where the transmit angle is steeper than the transducer can produce, the system may prompt a user to move the probe. The instructions may cause the transducer to emit tracking pulses such that they lie in a plane which may include the transmit line. The plane of the tracking pulses may be rotated about the transmit line to record SWE measurements along different measurement planes. The system may generate instructions to adjust the rotation of the tracking pulse plane to align with different measurement planes. Because the measurement planes include the transmit line, at each measurement plane the push pulse and tracking pulses may be perpendicular to the long axis of the selected fiber group.

The method 500 may include step 584 which may involve directing SWE measurements along the determined measurement planes. In the embodiment shown in FIG. 5, the system is configured to measure at a first measurement plane 585*a* and a second measurement plane 585*b*. More or less measurement planes may be used in other embodiments. The first measurement plane 585*a* is a plane which includes the transmit line and the long axis of the fiber. The second measurement plane 585*b* is a plane which includes the transmit line and is perpendicular to the long axis of the fiber. During measurement along a given one of the planes, the system may use the instructions generated in step 582 to transmit the push pulse along (or parallel to) the transmit line. The system may also use the instructions to generate tracking pulses such that they lie in the determined measurement plane. In some embodiments the transducer may be a 2D array transducer, and the system may automatically adjust the orientation of the push and tracking pulses. In some embodiments the 2D array may have a library of pre-calculated delay profiles and the system may select the push pulse angle and tracking pulse angle which are closest to the determined measurement plane. In some embodiments the system may provide the instructions to a user for manual adjustment of the angle of the pulses and/or rotation of the tracking pulse plane.

FIG. 6 is a block diagram depicting an example report in accordance with some examples of the present disclosure. FIG. 6 shows an example report 624, which may, in some embodiments, be used as the report 124 of FIG. 1. The report 624 may present or may summarize information about SWE measurements (e.g., the SWE measurements collected in step 362 of FIG. 3 and/or step 584 of FIG. 5). The report 624 may include calculated parameters 686, an orientation display 688, and a graphical measurement display 690. FIG. 6 also shows an alternate orientation display 688' which may be used in addition to, or instead of, the orientation display 688 of the report 624.

The report 624 may be generated by the system to present the results of SWE measurements. The report 624 may be displayed (e.g., on display 110 of FIG. 1) and/or saved in a memory (e.g., memory 118 of FIG. 1). The report may include data from the SWE measurements, parameters calculated from the SWE data, and/or additional information (e.g., information about the measurements, such as time, technician ID, subject information, etc.). Although a particular layout and presentation of information are shown in FIG. 6, it is to be understood that the information about the SWE measurements may be presented in a variety of different formats and arrangements.

The report 624 includes calculated parameters 686. The calculated parameters 686 may be parameters which are derived from the SWE measurements. In some embodiments, the calculated parameters 686 may be presented as a text display. In some embodiments the calculated parameters may be presented as a graph or other graphical representation. The particular calculated parameters shown include a mean stiffness and a cross/parallel stiffness ratio. The stiffness may be calculated based on the shear wave velocity measured by the SWE. The system may have collected a variety of stiffness measurements at measurement planes with different angles with respect to the tissue (e.g., along the fiber, across the fiber, and/or angles in between). The mean stiffness may be an average of the stiffness measured at all of the angles for given fiber group. The cross/parallel stiffness ratio may be a ratio of the stiffness measured across the fiber (e.g., at 90°) to the stiffness measured along the fiber (e.g., at 0°). The calculated parameters 686 may have a different color of text depending on the relationship of the value of that parameter to a clinical range. For example, if the value of a particular calculated parameter falls within a normal clinical range, the text might be green, whereas if the calculated parameter is outside the normal clinical range, the text might be red.

The orientation display 688 and alternate orientation display 688' may be graphical representations of the selected fiber group, and measurement planes along which the SWE measurements were collected (e.g., the measurement planes determined in step 582 of FIG. 5). Although FIG. 6 shows only two measurement planes in the orientation displays 688 and 688', it is to be understood that more or less measurement planes could also be shown. In some embodiments, only certain measurement planes (rather than all measurement planes) will be shown. The orientation display 688 shows a representation of the fiber group which may be similar to the fiber group indicators 474, 476 of FIG. 4. The orientation display includes a pair of measurement planes, here shown as dotted lines superimposed on the representation of the fiber group. The measurement planes may labeled for reference. The alternate orientation display 688' shows a 3D rendering of the selected fiber group. The selected fiber group may be shown partially in cross section along the measurement planes. The exposed portions of the cross section may include representations of the individual fibers of the fiber group, and may be colored to distinguish the fiber orientation along the different measurement planes. Looping animation may be generated so that intermediate measurement planes can be visualized without requiring interaction from the user. In some cases, interpolation between the measurement planes is used for a smoother animation.

The graphical measurement display 690 shows a graphical representation of the data collected from the SWE measurements. The graphical measurement display 690 may include raw data (e.g., shear wave speed) and/or calculated parameters (e.g., tissue stiffness). The particular graphical measurement display 690 of FIG. 6 shows a polar graph of stiffness along three measurement planes. The measurement planes are along the fiber axis (e.g., 0°), across the fiber plane (e.g., 90°), and halfway in-between (e.g., 45°). The graph shows a line for each of the measurements, where each line has a rotation corresponding to the angle of its measurement plane and a length corresponding to the stiffness measured in that measurement plane. The graph also includes an ellipsoid drawn so that its perimeter touches the end of each line. One or more labels may also be provided on the graphical measurement display 690. A color of the line and/or label may change depending on the measurements relationship to a clinical range.

Figure 7:
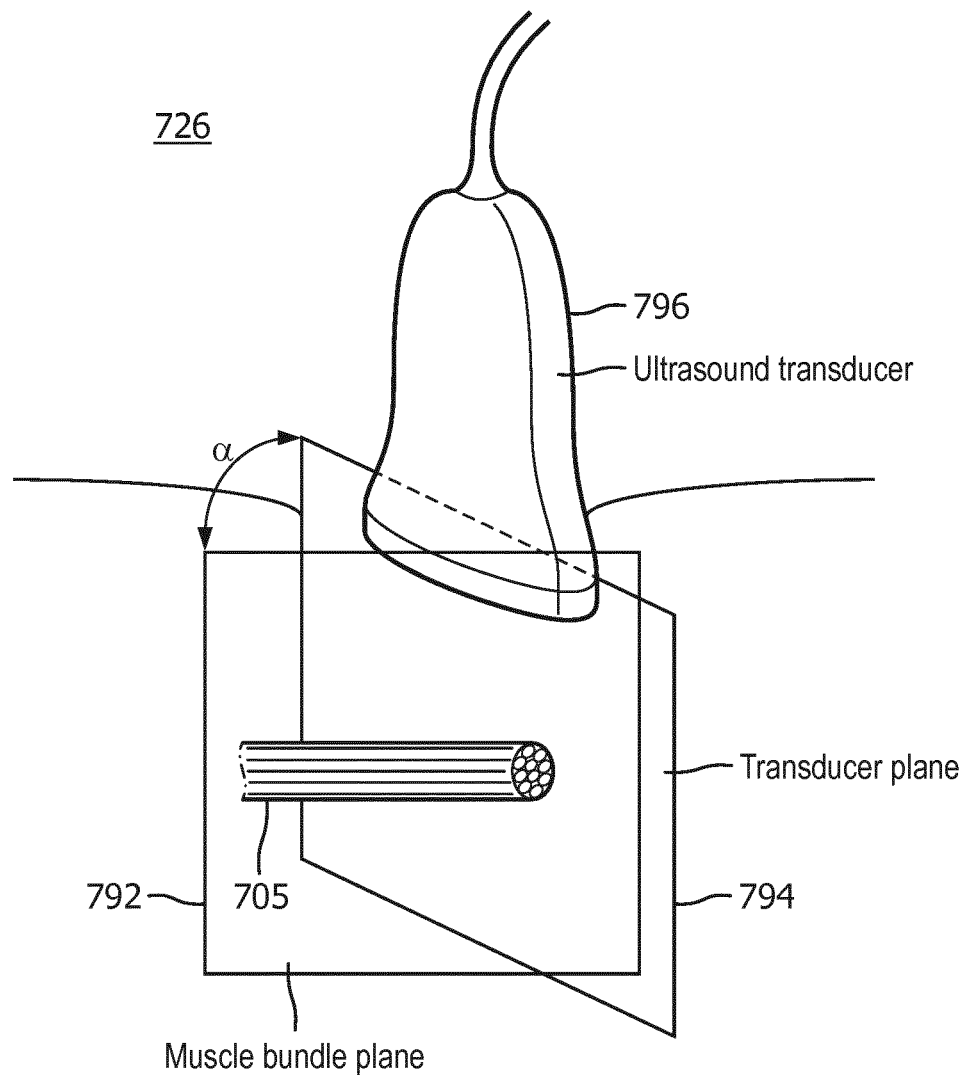
FIG. 7 is a block diagram depicting a feedback display for shear wave elastography measurements in accordance with some examples of the present disclosure.

FIG. 7 is a block diagram depicting a feedback display for shear wave elastography measurements in accordance with some examples of the present disclosure. The feedback display 726 may be used, in some embodiments, as the feedback display 126 of FIG. 1. The feedback display 726 includes a probe indicator 706, a fiber group indicator 705, a target measurement plane indicator 792, and a current measurement plane indicator 794. The feedback display 726 may be selectively displayed by the system to guide placement and/or rotation of the measurement plane in order to achieve one or more of the determined measurement planes (e.g. the measurement planes determined in step 582 of FIG. 5).

The probe indicator 706 may be a graphical representation of the probe (e.g., probe 106 of FIG. 1). The probe indicator 706 may be a realistic representation of the probe or may be a simplified representation (e.g., a geometric shape). The probe indicator 706 may be shown in relation to the fiber group indicator 705. The probe indicator 706 may update in real-time to reflect a current position of the probe. The fiber group indicator 705 may be a graphical representation of a selected fiber group, and may be similar to the fiber group indicator 474 of FIG. 4.

The feedback display 726 may include a target measurement plane indicator 792. The target measurement plane indicator 792 may represent a target measurement plane for an SWE measurement. The target measurement plane may be one of the determined measurement planes (e.g., the measurement planes determined in step 582 of FIG. 5). If the system has determined multiple measurement planes, then the target measurement plane may be a next one of the sequence of multiple measurement planes. The feedback display 726 may also include a current measurement plane indicator 794. The current measurement plane indicator 794 may be a graphical representation of a measurement plane from which data would be recorded at the probes current position and/or settings.

The system may measure a difference between the target measurement plane and the current measurement plane. In some embodiments, the feedback display 726 may update in real-time as the probe is repositioned. In some embodiments, the feedback display 726 may provide instructions for re-positioning the probe (e.g., rotate by α° counter-clockwise). The system may direct a user to make a measurement when the current imaging plane is aligned with the target imaging plane. In some embodiments, the system may automatically record a measurement when the current imaging plane and the target imaging plane are aligned. When a measurement has been collected along the target measurement plane, the system may update to provide a new target plane (or indicate that the measurement sequence for the selected fiber bundle is complete), and the feedback display 726 may update accordingly.

Figure 8:
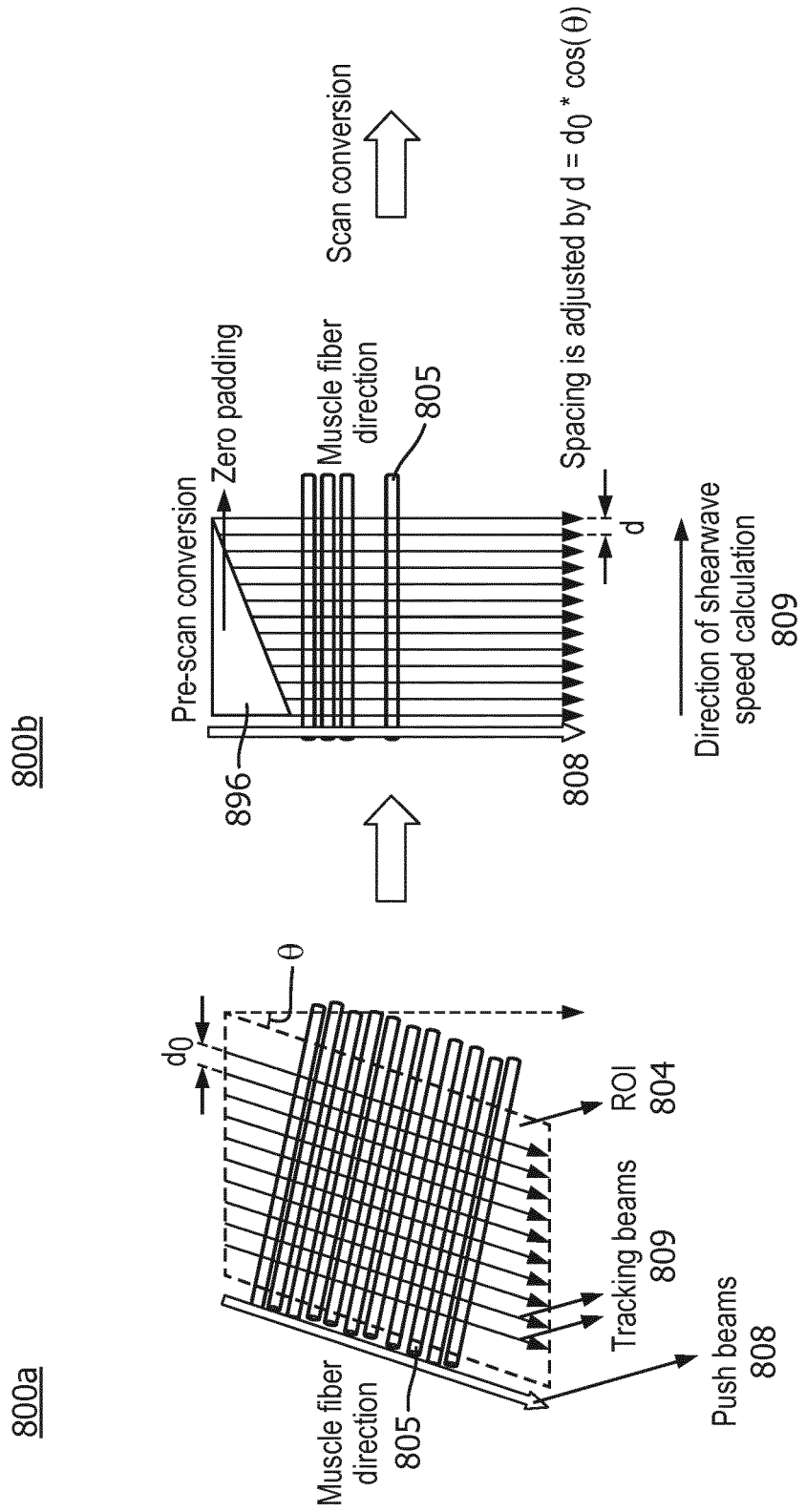
FIG. 8 is a block diagram of pre-scan conversion in accordance with some examples of the present disclosure.

FIG. 8 is a block diagram of pre-scan conversion processing in accordance with some examples of the present disclosure. After collecting raw SWE measurements, scan conversion may be used to generate an image from the measurements. In some embodiments, pre-scan conversion processing may be used to simplify scan conversion. For example, pre-scan conversion processing may reduce the load on the processor (e.g., processor 116 of FIG. 1) during scan conversion. FIG. 8 represents a scan 800a and a scan 800b after pre-scan conversion processing. The scan representations 800a-b include muscle fibers 805, push pulse 808, tracking pulses 809, a tissue region of interest 804, and zero padding 896. The scans 800a-b may be scans acquired by the probe 106 of FIG. 1, and the pre-scan conversion processing may be carried out by processor 116 of FIG. 1.

Scan 800a represents a scan along a measurement plane through anisotropic tissue 804. The tissue 804 may include a fiber bundle 805. For simplicity, the fiber bundle 805 is shown as a flat layer of fibers in the measurement plane, where the fibers are all parallel to each other and evenly spaced. During SWE measurement, a push pulse 808 is emitted into the tissue to generate shear waves, the velocity of which is measured with tracking pulses 809. The push pulse 808 and tracking pulses 809 may be generated such that they are perpendicular to the fibers 805. However, the transducer (e.g., transducer 107 of FIG. 1) may be flat against a surface of the skin (e.g., horizontal in the layout as shown in FIG. 8). The transducer may generate the tracking pulses 809 with a spacing of d0. In order to be perpendicular to the long axis of the fiber bundle 805, the tracking pulses 809 may be emitted at an angle θ to the normal of the face of the transducer.

Scan 800b represents a version of the scan 800a after pre-scan conversion processing. The scan 800b as shown may represent correction of the angles of the scan 800a rather than representing a change in the physical geometry at which the scan 800a is occurring. The pre-scan conversion processing may be applied by a processor (e.g., processor 116 of FIG. 1) and used to correct shear wave velocity measurements to account for the angle θ of the push and tracking pulses 808, 809. Zero padding 896 may be inserted along the tracking pulses 809 to model the angle, and a correction factor may be used to scale the shear wave speed measurements. A scaled spacing d may be calculated by equation 1 below:

$$d = d_0 * \cos(\theta) \qquad \text{Eqn. 1}$$

The pre-scan conversion processing as shown by the scan 800b may be used because the since the push pulse 808 and tracking pulses 809 are perpendicular to the fibers 805, the wave front of the pulses 808, 809 should appear as a flat front from the fibers 805 perspective. Thus, after pre-scan conversion 800b, the wave front of the pulses 808, 809 may be treated as a flat wave traveling vertically through the tissue 804 as shown. Accordingly, the corrected spacing d, and the zero padding 896 may be used to adjust for the timing of the tracking pulses 809. Since the push and tracking pulses 808, 809 are not perpendicular to a face of the transducer, the scan 800b represents an adjustment of the distances (e.g., with Equation 1) between the pulses to account for the non-perpendicular angle with the transducer. After pre-conversion scan processing, the data represented by scan 800b may undergo scan conversion.

Figure 9:
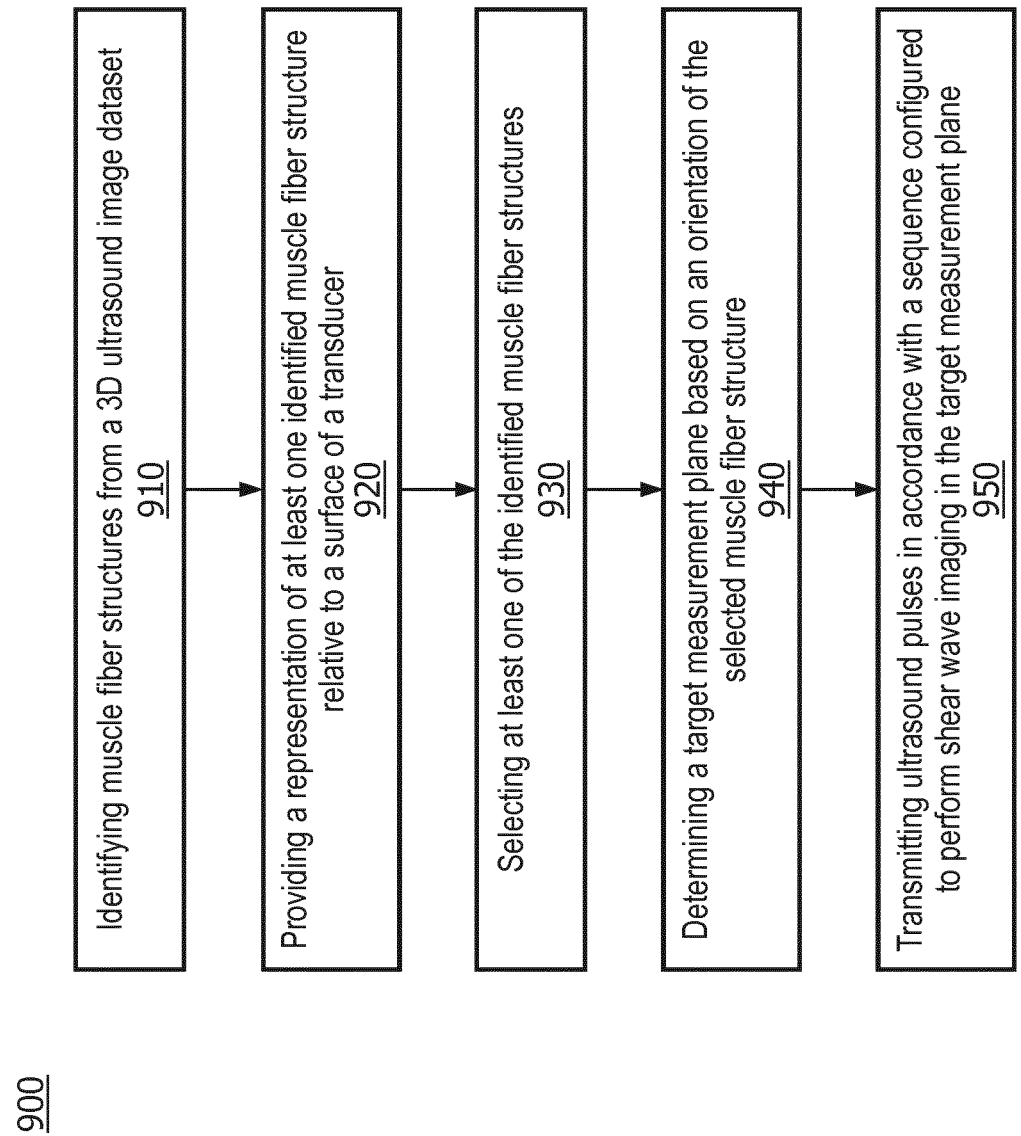
FIG. 9 is a flow chart depicting a method of smart shear wave elastography in accordance with some examples of the present disclosure.

FIG. 9 is a flow chart depicting a method of smart shear wave elastography in accordance with some examples of the present disclosure. The method 900 may include steps 910-950. The steps 910-950 may be performed in any order, and certain steps (or groups of steps) may be repeated. Certain steps may be omitted and/or additional steps may be added to the method 900. The method 900 may be implemented the ultrasound system 102 of FIG. 1 (e.g., as instructions 120). The method 900 may implement all or part of the method 300 of FIG. 3 and/or the method 500 of FIG. 5.

The method 900 includes step 910—identifying muscle fiber structures from a 3D ultrasound image dataset. The method may also include acquiring the 3D ultrasound image dataset. The 3D dataset may be acquired using 3D imaging (e.g., B-mode imaging from a 2D transducer array) or may be assembled from multiple 2D images. The 3D data set may be saved to a memory (e.g., memory 118 of FIG. 1) and may be retrieved for later use.

Step 910 may be followed by step 920—providing a representation of at least one identified muscle fiber structure relative to a surface of a transducer. An automatic segmentation process may be used to determine the location and orientation of fibers in the 3D data set. In some embodiments, the segmentation algorithm may be a neural network (which may implement a deep learning algorithm). The neural network may be trained on training data which may include 2D images and/or 3D images. In some embodiments where the neural network is trained on 2D images, the 3D data set may be split into 2D slices before segmentation with the neural network. In some cases, the system may calculate an overall position and/or orientation for the fibers of a given muscle fiber bundle. A display which includes the representations of the identified muscle fiber structures may be provided to a user. The user may be prompted to select one of the muscle fiber bundles represented in the display. The user may interact with a display to select the muscle fiber bundle. In some embodiments, the system may automatically select the muscle fiber bundle.

Step 920 may be followed by step 930—selecting at least one of the identified muscle fiber structures. In some embodiments a user may be prompted to select one of the identified muscle fiber structures in the provided representation. The user may operate one or more input devices of the system (e.g., mouse, keyboard, etc.) to select one or more of the muscle fiber structures. In some embodiments, the system may automatically select one or more of the fiber structures. When multiple fiber structures are selected, steps 940 and 950 may be repeated for each of the selected muscle fiber structures.

Step 930 may be followed by step 940—determining a target measurement plane based on an orientation of the selected muscle fibers structure. The system may calculate one or more measurement planes along which to perform SWE measurements. In some embodiments the system may calculate a transmit line such that pulses emitted along the transmit line are perpendicular to the determined long axis of the fiber. The transmit line may have an angle to a normal through the face of the transducer. The measurement plane may be defined to include the transmit line. The system may adjust measurement parameters (e.g., by adjusting the transmit angle to match the angle of the transmit line). In some embodiments the system may adjust the transmit angle automatically. In some embodiments the system may provide feedback for a user for manual adjustment of the transmit angle.

Step 940 may be followed by step 950—transmitting ultrasound pulses in accordance with a sequence configured to perform shear wave imaging in the target measurement plane. The shear wave elastography may be performed along one or more measurement planes. The measurement planes may be perpendicular to the long axis of the fiber (e.g., the measurement planes may include the transmit line calculated in step 940). The system may produce instructions to cause the transducer to produce a push pulse and tracking pulses in the measurement plane and record echoes from the tracking pulses to determine a speed of the shear wave generated by the push pulse. The instructions may be operated automatically (e.g., by controller 114 of FIG. 1) and/or may be provided on a feedback display to a user for manual adjustment. The system may calculate one or more parameters (e.g., stiffness) from the measured shear wave speed. The system may produce instructions for alignment with a next measurement plane and the measurement process may repeat.

In various embodiments where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software and firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instruction to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method of shear wave elastography comprising:
providing a representation of muscle fiber structures in a 3D ultrasound image dataset relative to a surface of a transducer;
selecting at least one of the muscle fiber structures;
determining a target measurement plane based on an orientation of the selected muscle fiber structure; and
transmitting ultrasound pulses in accordance with a sequence configured to perform shear wave imaging in the target measurement plane.

2. The method of claim 1, wherein the transmitting ultrasound pulses is in accordance with a sequence configured to perform shear wave elastography imaging at multiple measurement planes.

3. The method of claim 2, wherein the multiple measurement planes comprise a first measurement plane parallel to a long axis of the selected muscle fiber structure and a second measurement plane perpendicular to the long axis of the selected muscle fiber structure.

4. The method of claim 2, wherein the multiple measurement planes are perpendicular to the orientation of the selected muscle fiber structure and rotated about a line perpendicular to a long axis of the selected muscle fiber structure.

5. The method of claim 1, wherein the method further comprises providing the 3D ultrasound image dataset to an artificial neural network trained to identify muscle fiber structures from ultrasound image data.

6. The method of claim 1, further comprising determining the orientation of the muscle fiber structures.

7. The method of claim 6, wherein the determining the orientation of the muscle fiber structures comprises determining an average orientation of fibers within each of a plurality of fiber groups.

8. The method of claim 6, wherein a transmit angle of the transducer is adjusted to be perpendicular to the orientation of the selected muscle fiber structure.

9. The method of claim 8, wherein the transmit angle of the transducer is automatically adjusted based on a library of transmit angles.

10. The method of claim 1, further comprising:
generating at least one shear wave elastography measurement; and
applying pre-scan conversion processing to the shear wave elastography measurement.

11. The method of claim 10, wherein the applying the pre-scan conversion processing comprises applying zero padding and a scaling factor to the shear wave elastography measurement.

12. The method of claim 1, further comprising calculating a tissue parameter based on the performed shear wave imaging and determining a disease state of the tissue based on the calculated tissue parameter.

13. A non-transitory computer-readable medium comprising executable instructions, which when executed cause a processor of an ultrasound imaging system to perform the method of claim 1.

14. An ultrasound shear wave elastography system comprising:
a transducer, configured to emit a push pulse and tracking pulses into a tissue; and
a processor coupled to the probe, the processor configured to:
provide a representation of muscle fiber structures in a 3D ultrasound image dataset of the tissue relative to a surface of the transducer;
in response to a user selection of one of the muscle fiber structures, determine a target measurement plane based on an orientation of the selected muscle fiber structure; and
in response to the user selection of the one of the muscle fiber structures, provide instructions to adjust an angle of the push pulse and the tracking pulses with respect to the tissue to perform shear wave imaging in the target measurement plane.

15. The system of claim 14, further comprising a display configured to present a feedback display based on the instructions.

16. The system of claim 15, wherein the display is further configured to present a fiber orientation display based on a location of the muscle fiber structures.

17. The system of claim 14, wherein the processor is further configured to record shear wave elastography measurements based on the push pulse and the tracking pulses.

18. The system of claim 17, wherein the processor is configured to produce a report based on the shear wave elastography measurements.

19. The system of claim 14, wherein the transducer comprises a 2D array transducer and wherein the system is configured to operate the 2D array transducer based on the instructions to automatically adjust the angle of the push pulse and the tracking pulses.

20. The system of claim 14, wherein the processor is further configured to provide instructions for aligning the push pulse and the tracking pulse with at least one measurement plane about the selected muscle fiber structure.

* * * * *